Figure 1:
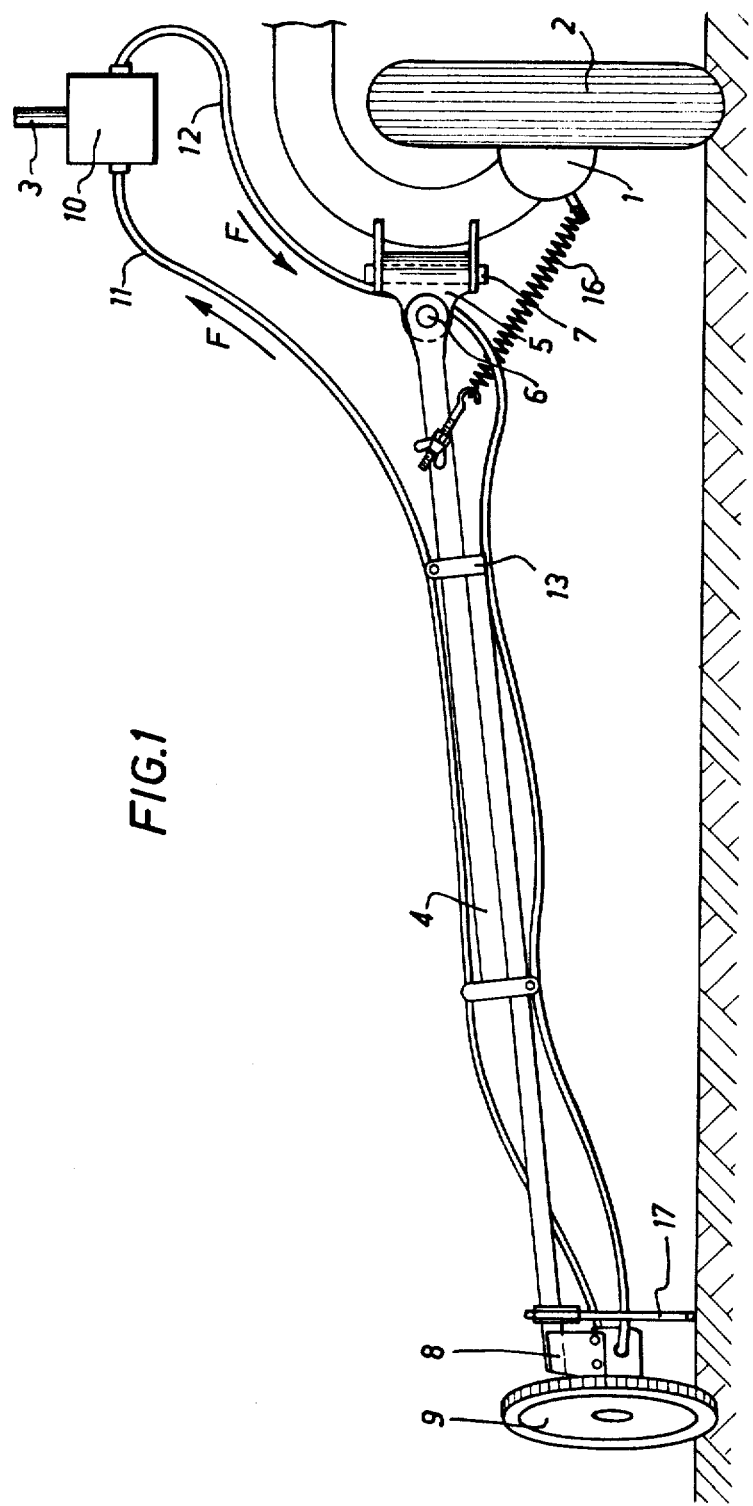

United States Patent

Grataloup

[11] 3,903,970
[45] Sept. 9, 1975

[54] WORKING AREA MARKING MECHANISM FOR AGRICULTURAL MACHINES

[75] Inventor: Xavier Roger Grataloup, Montereau, France

[73] Assignee: Societe Anonyme: Nodet Gougis, Montereau, France

[22] Filed: Apr. 26, 1974

[21] Appl. No.: 464,460

[30] Foreign Application Priority Data
May 2, 1973 France .................. 73.15753

[52] U.S. Cl. .................................. 172/126; 172/2
[51] Int. Cl.² .................. A01B 17/00; A01B 65/02
[58] Field of Search .................. 172/125–132, 172/2; 111/33

[56] References Cited
UNITED STATES PATENTS

| | | | |
|---|---|---|---|
| 607,887 | 7/1898 | Smith | 172/126 |
| 652,291 | 6/1900 | Priestley | 111/33 |
| 1,076,358 | 10/1913 | Foreman | 172/126 X |
| 1,076,938 | 10/1913 | Anfinson | 172/126 |
| 1,911,218 | 5/1933 | White | 172/128 |
| 1,924,509 | 8/1933 | McGlinch | 172/126 X |
| 3,529,672 | 9/1970 | Smith | 172/126 X |
| 3,754,603 | 8/1973 | Bogie | 172/125 X |

*Primary Examiner*—Clifford D. Crowder
*Assistant Examiner*—Paul T. Sewell
*Attorney, Agent, or Firm*—Baldwin, Wight & Brown

[57] ABSTRACT

A marking mechanism for marking the limits of the working area of an agricultural machine. A lightweight support arm is horizontally and vertically pivotally mounted on the machine. A marking member which is preferably a cutting disc is rotatably mounted at the free end of the support arm. A spring ensures the pressure exerted by the cutting disc on the ground. The cutting disk is driven from a power take-off of the tractor pulling the machine or the wheels of the machine. A pump is driven by the power take-off which in turn drives a motor which rotates the cutting disk. An adjustable control valve is interposed in the pump-motor fluid circuit upstream of the motor for controlling the flow of liquid to the motor in response to pivotal displacement of the support arm relative to the frame of the machine to return the support arm to its proper position from a leading or lagging position by slowing down or speeding up the rotational speed of the cutting disk.

2 Claims, 2 Drawing Figures

WORKING AREA MARKING MECHANISM FOR AGRICULTURAL MACHINES

The present invention relates to a marking mechanism for marking the limits of the area worked by agricultural machines.

It is well known that the working widths of agricultural machines are increasing constantly. There is therefore a greater necessity to mark the part of the ground which has been "treated" during a pass so that the following pass does not go over the same ground again and does not leave any part of the ground untouched. As long as the working width of apparatus was relatively small (up to 13–17 feet), for the most part marking devices were used which made a cut or furrow in the ground along a path over which one of the wheels of the tractor was to roll during the next pass: such marking devices comprise an idle disk or a fixed metal member which is mounted at the end of an arm ("sideways arm") pivotally mounted on the machine; during the operation of the machine, the arm pulls the marking member in such a way that the disk is driven in rotation cutting a furrow in the ground or that the fixed metal member cuts such a furrow in the manner of a share. As the working width of the machine increases the length of the arm must also increase, and this arm must be able to withstand very high torque which makes such a marking system much too expensive.

Another solution which is used consists in depositing small mounds of foam which service as a reference line for the following pass of the machine; this method also has considerable drawbacks, viz:

the transportation of water for making the foam;

the use of a foaming agent which is generally expensive;

the need to have s ource of compressed air for making the foam; and the rather rapid disintegration of the marks (small mounds of foam) which results in the disappearance of the marks and requires, when the working is not a continuous one, the use of reference points such as ranging pickets for example.

An object of the present invention is to overcome these drawbacks and provide means for making a marking line on the ground far from the axis of the tractor, which does not require an arm of heavy duty construction.

To achieve the object in a simple manner, I came up with the idea of using the sideways extending arm only to carry the mechanical marking member and of driving the marking member from the tractor or machine.

Under these conditions, a mechanical marking member at the end of an arm of lightweight construction is powered by the tractor, or the wheels of the machine if it is driven. The power provided enables the same mechanical member to cut a furrow and at the same time by bearing against the ground to provide the forward displacement of the marking member and the arm carrying it. This arm is pivotally mounted on the apparatus and the variation of the angle the arm makes with the machine enables the adjustment of the supply of energy to the marking member and therefore its speed of forward displacement. The arm carrying the marking member does not drag or pull the marking member since the latter moves forward on its own at the speed of the machine.

A more specific object of the invention consists in a marking mechanism for agricultural machines including a marking member mounted on a support arm which is itself mounted on the frame of the machine, wherein the support arm is pivotally mounted at one end about a horizontal and a vertical pivot on the frame, a marking member is rotatably mounted at the other end of the support arm and driven directly from the machine, the frame carrying means responsive to the operation of the support arm and effecting the drive of the marking device. According to a further feature of the invention, resilient means are provided between the support arm and the frame for ensuring sufficient pressure of the marking member on the ground.

The marking member is preferably a cutter, miller or a cutting disk.

The length of the support or carrier arm may be adjustable in length, for example telescopic.

The rotational and forward drive of the marking member is effected by a hydraulic motor driven by a pump controlled by means of the power take-off gear of the tractor or from the wheels of the machine.

The motor is supplied through tubing including a control valve. The adjustment of the control valve may be effected by a member fixed to the support or carrier arm and acting on the valve member of the control valve.

The end of the support arm adjacent the marking member may support a hinged feeler arm for ensuring the depth of the cut marked in the ground.

Figure 2:
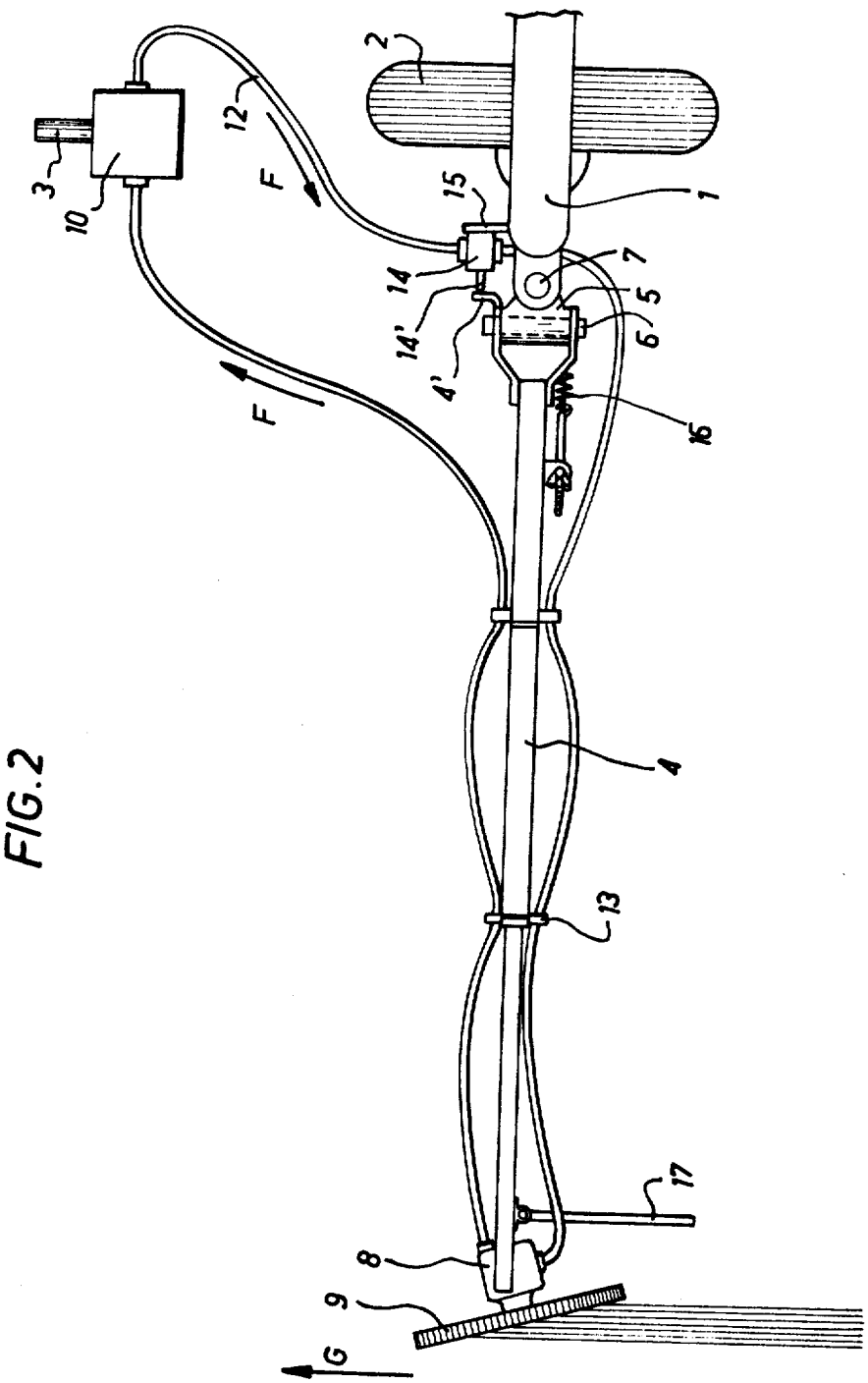

An embodiment of the marking mechanism according to the invention will be described hereinbelow by way of example with reference to the accompanying drawings, in which:

FIG. 1 is a side elevation view from the rear of the marking mechanism according to the invention; and FIG. 2 is a corresponding top view of the marking mechanism.

Part of the frame 1 and the wheel 2 of an agricultural machine according to the invention are shown in the drawings as well as a power take-off 3 of the tractor pulling the machine. The marking mechanism of the invention comprises a support arm 4 at one or both sides of the machine; preferably the length of the support arm is adjustable by any known means. One end of the support arm 4 is mounted by a pivotal mounting 5 on the frame 1, the pivotal mounting including a horizontal pivot pin 6 and a vertical pivot pin 7. The other end of the support arm 4 has an angularly adjustable hydraulic motor 8 which carries a marking member which in the example shown is a cutting disk 9 rotating at a given speed as will be specified hereinafter; the angular position of the cutting disk 9 is adjustable with respect to the direction of forward displacement of the machine in order to be able to suitably mark different soils.

The hydraulic motor 8 gets its energy from a hydraulic pump 10 driven by the power take-off 3 of the tractor. The motor 8 - pump 10 connection is provided by the tubes 11 and 12 through which liquid flows in the directions indicated by the arrows F for the direction of forward movement indicated by the arrow G. The tubes 11 and 12 are secured by clamps 13 on the support arm 4 with providing a slack to compensate for various lengths to which the arm 4 may be adjusted. The supply of liquid through the tube 12 to the hydraulic motor 8 associated with the cutting disk 9 is adjustable by means of a control valve 14 secured to the frame 1 by a mounting member 15. The control valve 14 is automatically adjusted or regulated by the support arm 4 carrying the cutting di as a function of its forward displacement, thereby opening more or less the control valve 14, as is necessary. Finally, the mechanism according to the invention includes resilient means or a spring 16 of adjustable tension which determines the penetration of the cutting disk into the different types of soil, and a hinged feeler arm 17 for determining the depth of the cut made by the cutting disk, the feeler arm 17 being pivoted not far from the cutting disk 9.

The operation of the mechanism is as follows:

The cutting disk 9 is mounted for rotation and forward displacement in the direction of the forward displacement of the machine; the cutting disk 9 is driven by liquid from the pump 10 carried through the tube 12 through the control valve 14, the following regulating member 14' of the valve being held against the lyg 4' on the support arm 4, to the hydraulic motor 8 and returns to the pump 10 through the tube 11. The cutting disk 9 rotating in the direction of the forward displacement of the machine draws the support arm 4 forwardly, the support arm pivoting on its vertical pivot 7 of its pivotal mounting (clockwise in FIG. 2) relative to the frame of the machine.

This displacement acts progressively through the follower regulating member 14' bearing against the lug 4' the closure of the control valve thereby reducing the speed of rotation of the cutting disk 9 and therefore the forward speed of the support arm; thus the support arm is returned to its normal position relative to the frame 1.

Conversely, if there occurs a too great lead of the machine frame forward movement over the forward movement of the cutting disk 9, the support arm 4 pivots rearwardly, thus causing the opening of the valve 14 to increase the speed of the cutting disk 9.

Under these circumstances, the mechanism automatically controlled by its displacement with respect to the frame 1, provides a marking line parallel to the axis of the forward movement of the machine without large forces being exerted on the support arm 4 nor on the frame 1. It will be noted that the horizontal pivot 6 of the pivotal mounting allows the support arm to be raised completely for non-working travel on a road or when marking only at one side of the machine.

Finally, it is to be noted that the hydraulic motor may be driven directly from the wheels of the agricultural machine.

What I claim is:

1. In a marking mechanism for marking limits of the working area of an agricultural machine having a frame, a support arm, means for pivotally mounting one end of said support arm on the machine frame for pivotal generally horizontal movement, a hydraulic pump carried by said machine and driven concurrently with movement of the machine over an area to be marked, a hydraulic motor mounted on said support arm and being operatively connected to said marking member for rotating the latter, tubing connecting said pump to and from said motor, an adjustable control valve interposed in said tubing for varying the speed of rotation of said motor and said marking member, and means responsive to pivotal generally horizontal movement of said support arm for adjusting the opening of said control valve as a function of the generally horizontal movement of said support arm relative to said frame thereby to vary the speed of rotation of said hydraulic motor and said marking member.

2. A marking mechanism according to claim 1 in which said means responsive to pivotal generally horizontal movement of said support arm comprises a member mounted on said support arm for movement therewith for operating said control valve to adjust the opening therein as a function of the pivotal displacement of said support arm relative to the frame.

* * * * *